United States Patent
Cook

(10) Patent No.: US 8,750,473 B2
(45) Date of Patent: Jun. 10, 2014

(54) SYSTEM AND METHOD FOR COMMUNICATION BETWEEN MOBILE DEVICES USING DIGITAL/ACOUSTIC TECHNIQUES

(75) Inventor: Perry R. Cook, Applegate, OR (US)

(73) Assignee: Smule, Inc., San Francisco, CA (US)

( * ) Notice: Subject to any disclaimer, the term of this patent is extended or adjusted under 35 U.S.C. 154(b) by 1027 days.

(21) Appl. No.: 12/553,788

(22) Filed: Sep. 3, 2009

(65) Prior Publication Data

US 2010/0053169 A1    Mar. 4, 2010

Related U.S. Application Data

(60) Provisional application No. 61/094,055, filed on Sep. 3, 2008.

(51) Int. Cl.
*H04M 11/00* (2006.01)

(52) U.S. Cl.
USPC ...................................... 379/93.37; 455/41.2

(58) Field of Classification Search
USPC .......... 379/344, 93.37; 455/11.1, 20, 22, 41.2
See application file for complete search history.

(56) References Cited

U.S. PATENT DOCUMENTS

| | | | |
|---|---|---|---|
| 4,001,949 A | 1/1977 | Francis | |
| 4,437,088 A | 3/1984 | Ferguson | |
| 6,084,952 A * | 7/2000 | Beerman et al. | 379/93.25 |
| 6,608,669 B2 | 8/2003 | Holton | |
| 6,622,018 B1 | 9/2003 | Erekson | |
| 6,737,957 B1 * | 5/2004 | Petrovic et al. | 340/5.86 |
| 7,701,895 B2 * | 4/2010 | Gehasie et al. | 370/328 |
| 7,706,548 B2 * | 4/2010 | Kanevsky et al. | 381/77 |
| 2006/0030263 A1 * | 2/2006 | Seligmann et al. | 455/41.2 |
| 2006/0153390 A1 | 7/2006 | Iwaki et al. | |
| 2008/0005130 A1 | 1/2008 | Logan et al. | |
| 2008/0105110 A1 | 5/2008 | Pietrusko et al. | |
| 2009/0070104 A1 * | 3/2009 | Jones et al. | 704/211 |
| 2009/0233551 A1 * | 9/2009 | Haartsen et al. | 455/41.3 |
| 2009/0310785 A1 * | 12/2009 | Barrus et al. | 380/259 |
| 2010/0030838 A1 * | 2/2010 | Atsmon et al. | 709/200 |
| 2010/0227549 A1 * | 9/2010 | Kozlay | 455/26.1 |

* cited by examiner

*Primary Examiner* — Olisa Anwah
(74) *Attorney, Agent, or Firm* — Haynes and Boone, LLP

(57) ABSTRACT

Techniques have been developed for transmitting and receiving information conveyed through the air from one portable device to another as a generally unperceivable coding within an otherwise recognizable acoustic signal. For example, in some embodiments in accordance with the present invention(s), information is acoustically communicated from a first handheld device toward a second by encoding the information in a signal that, when converted into acoustic energy at an acoustic transducer of the first handheld device, is characterized in that the acoustic energy is discernable to a human ear yet the encoding of the information therein is generally not perceivable by the human. The acoustic energy is transmitted from the acoustic transducer of the first handheld device toward the second handheld device across an air gap that constitutes a substantially entirety of the distance between the devices. Acoustic energy received at the second handheld device may then be processed using signal processing techniques tailored to detection of the particular information encodings employed.

43 Claims, 5 Drawing Sheets

SYSTEM AND METHOD FOR COMMUNICATION BETWEEN MOBILE DEVICES USING DIGITAL/ACOUSTIC TECHNIQUES

CROSS-REFERENCE TO RELATED APPLICATION(S)

The present application claims the benefit of U.S. Provisional Application No. 61/094,055, filed Sep. 3, 2008.

BACKGROUND

1. Field of the Invention

The invention relates generally to data communication and, in particular, to acoustic conveyance of information across an air gap between devices.

2. Description of the Related Art

During the latter half of the 20$^{th}$ century and prior to telecom deregulation, it was generally illegal to make an electrical connection to the public telephone network. At the same time, most premises telephones were hard-wired to wall terminals. Modular connectors like RJ11 had yet to be standardized. Nonetheless, with increased use and popularity of computing, techniques were needed to facilitate data interchange.

In part due to the ubiquity and physical uniformity of telephone handsets in businesses and homes, acoustic couplers were developed to connect modems to the telephone network. Speeds were typically 300 bits per second, achieved by modulating a carrier at 300 baud. One such device was the acoustic data coupler 300 modem introduced in 1968. Some of the basic technologies employed in such devices are described in U.S. Pat. No. 3,553,374. Acoustic modems became popular for encoding digital information using audible signals acoustically coupled into the phone network and transmitted as voice-band, analog signals over phone lines. Today, acoustically coupled devices have all but disappeared, except perhaps from museum collections. Even the once familiar, legacy-based tones and grinds of "dial up" negotiation have begun to disappear from our experience, replaced by Ethernet connections to cable/ADSL/satellite services, or 802.11x wireless (also called WiFi) connections. In each of the modern high-bandwidth communications services, acoustic transducers and even voice-band electronically-coupled startup negotiation sequences have long since been abandoned.

Modern modulation/demodulation devices (whether or not denominated as modems) are essentially silent, typically utilizing radio-frequency (RF) or higher-frequency electromagnetic energy conveyed over wires, in optical cables or waveguides and/or through freespace. Given the capabilities of these newer technologies and the very much higher bandwidth demands typical of modern data communications, mobile telephony and multimedia, etc., some might say that the era of acoustic modems has reached its end.

SUMMARY

It has been discovered that, for a range of mobile devices and applications, acoustic communications may actually facilitate interesting and desirable functionality and behaviors, particularly for short-range, peer-to-peer communications and those in which socially-relevant modalities of communication may facilitate collaboration or the user experience.

Accordingly, techniques have been developed for transmitting and receiving information conveyed through the air from one device to another as a generally unperceivable coding within an otherwise recognizable acoustic signal. For example, in some embodiments in accordance with the present invention, information is acoustically communicated from a first handheld device toward a second by encoding the information in a signal that, when converted into acoustic energy at an acoustic transducer of the first handheld device, is characterized in that the acoustic energy is discernable to a human ear yet the encoding of the information therein is generally not perceivable by the human. The acoustic energy is transmitted from the acoustic transducer of the first handheld device toward the second handheld device across an air gap that constitutes a substantially entirety of the distance between the devices. Acoustic energy received at the second handheld device may then be processed using signal processing techniques tailored to detection of the particular information encodings employed.

In some embodiments, the conveyed information may code the character or state of a physical object and/or process that may be simulated on the handheld devices. For example, in an illustrative use case, characterizing non-harmonic overtones for a Tibetan prayer bowl may be conveyed from one device to another in a way that, though not perceivable to a human, allows the devices to simulate transfer of the object from one device to the other or in a way that allows musically consonant prayer bowls to be instantiated at devices that receive the information bearing acoustic energy. In some embodiments, the conveyed information may code an attribute or identifier for the transmitting device (e.g., its MAC address) or for a user thereof. In another illustrative use case, contagious fire may be propagated (at least apparently) from one concert attendee's iPhone™ device to another that is proximate thereto using information acoustically conveyed in a signal coded beneath a human-perceivable veneer of "pops" and "crackles" consistent with a presented dynamic flame image. In still another illustrative use case, a coffee shop patron may hear a distinctive cricket chirp. Consulting a cricket dating application running on her cell phone or digital assistant confirms her suspicions that a potential cricket dater is nearby. Using identifying information (e.g., a URL or hyperlink) embedded in the chirp but decoded at her device, she reviews his on-line profile. Depending on what she sees, she may direct her device to respond with a chirp that encodes a passcode for Bluetooth pairing or with an invitation to an on-line chat room.

In some embodiments, information is coded as frequency-, phase- and/or amplitude modulations of a constituent tone or tones of an acoustic signal, where the modulations are generally not perceivable by the human, but the acoustic signal is not only discernable but is pleasing and/or contextually relevant to a particular social interaction. In some embodiments, information is coded in one or more additional tones included with a human-discernable acoustic signal. In some embodiments, information is coded as the selection of (or perturbations to a set of) harmonic overtones, non-harmonic overtones or both included in a generally pleasing acoustic signal. In some embodiments, information is coded as structured noise or as anomalous phase components in an acoustic signal that presents an otherwise consistent stereo field.

Consistent with the particular coding techniques employed at a transmitter, appropriate and generally conventional signal processing techniques may be employed at a receiver to detect or otherwise obtain the information coded in the acoustic signal. Accordingly, although much of the acoustic energy will be discernable to a human ear and, in some embodiments may even be pleasant, recognizable or semantically relevant to a human, the information coded in acoustic signal is generally not perceivable by a human but readily ascertainable at the second, receiving handheld device.

These and other embodiments in accordance with the present invention(s) will be understood with reference to the description and appended claims which follow.

BRIEF DESCRIPTION OF THE DRAWINGS

The present invention is illustrated by way of example and not limitation with reference to the accompanying figures, in which like references generally indicate similar elements or features.

Figure 1:
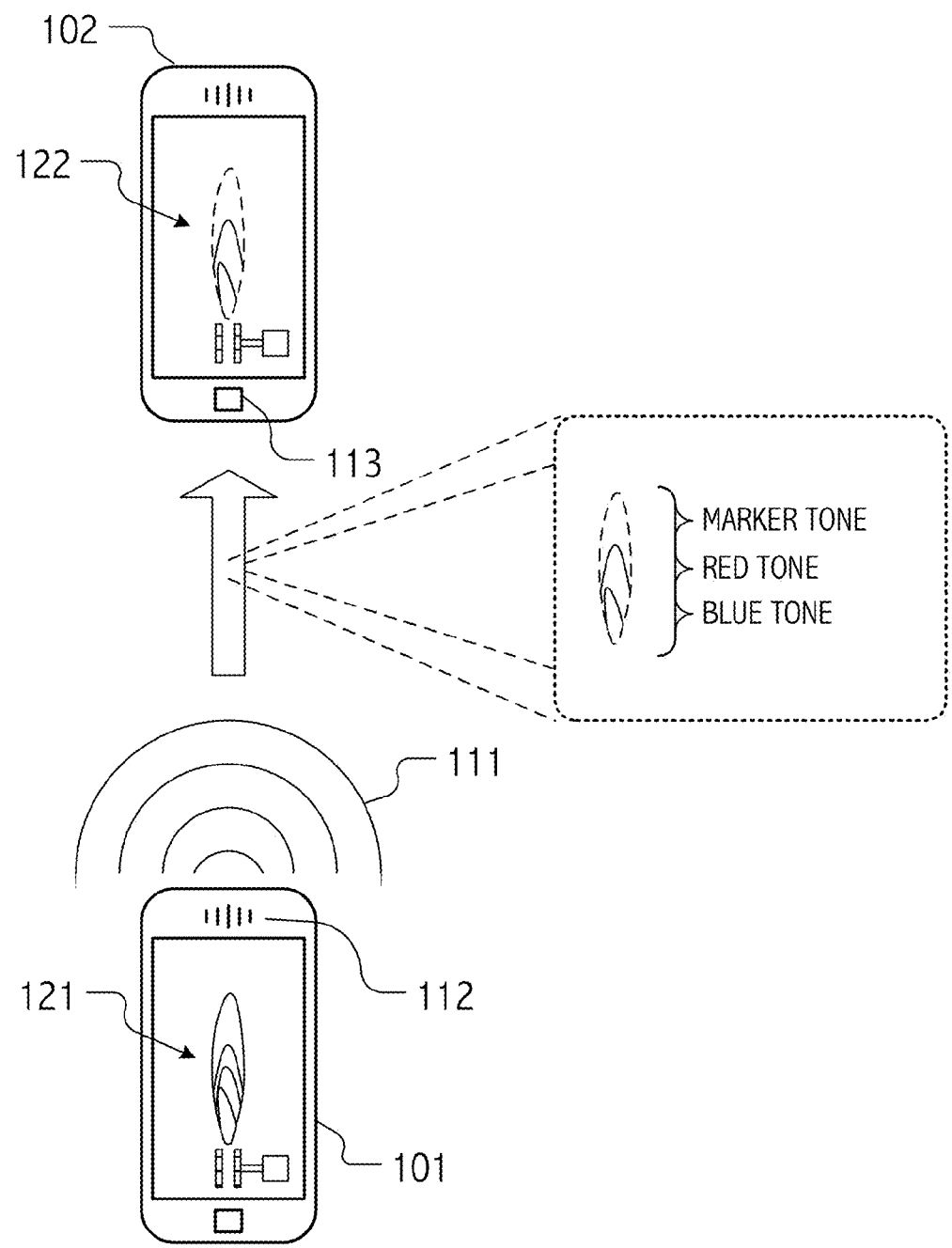
FIG. 1 is a functional block diagram that illustrates communication between mobile devices using acoustic techniques in accordance with some embodiments of the present invention.

Skilled artisans will appreciate that elements or features in the figures are illustrated for simplicity and clarity and have not necessarily been drawn to scale. For example, the dimensions or prominence of some of the illustrated elements or features may be exaggerated relative to other elements or features in an effort to help to improve understanding of embodiments of the present invention.

DETAILED DESCRIPTION

Notwithstanding the demise of acoustic couplers for voice-band modems and telephony, there are exciting new applications for acoustic information codings and modems, especially in the growing application areas of portable handheld devices such as personal digital assistants (PDAs), mobile phones, smart phones (often combining PDA functions with telephony and internet services), media players, netbooks, book readers, etc.

In the description that follows, certain illustrative acoustically-mediated information transactions and computational platforms typical of mobile handheld devices are used in the context of teaching examples. In particular, computational facilities, feature sets, application programmer interfaces (APIs), acoustic transducer and radio frequency communication capabilities, displays, software delivery and other facilities typical of modern handheld mobile devices. In this regard, the description herein assumes a familiarity with capabilities and features of devices such as iPhone™ handhelds, available from Apple Computer, Inc. However, based on the description herein, persons of ordinary skill in the art will appreciate applications to a wide range of devices and systems, including other portable devices whether or not hand held (or holdable). Indeed, based on the description herein, persons of ordinary skill in the art will immediately appreciate applications and/or adaptations to laptop computers, netbooks and other portable devices. More generally, while mobile handheld devices provide a useful descriptive context, that context is not intended to limit the scope of the appended claims.

Likewise, in the description that follows, certain interactive behaviors and use cases consistent with modern social networking are provided as examples. In some cases, simulations or digitally-synthesized versions of musical instruments or bio sounds may play prominent roles in the interactive behaviors and/or use cases. While these sounds provide a richness of user experience, particularly relative to opportunities for embedding information in melodious, familiar, contextual appropriate, pleasing or just plain "cool" acoustic signals (sounds) synthesized and transduced as part of a multimedia-rich interactive application, the described techniques may be employed in a wide range situations, including situations in which the acoustic information is far more mundane. Accordingly, while particular sounds, musical instruments and/or socially-based interactive behaviors and use cases provide a useful descriptive context, that context is not intended to limit the scope of the appended claims.

Finally, some of the description herein assumes a basic familiarity with programming environments and, indeed, with programming environments that facilitate the specification, using a high-level audio programming language, of code for real-time synthesis, composition and performance of audio. Indeed, some of the description herein presents functionality as source code from a high-level audio programming language known as ChucK. Programming tools and execution environments for ChucK code include a ChucK compiler and a ChucK virtual machine, implementations of which are available from Princeton University (including executable and source forms published at http://chuck.cs.princeton.edu/). The ChucK language specification and the ChucK Programmer's Reference provide substantial detail and source code. ChucK and ChucK implementations are based on work described in considerable detail in Ge Wang, *The ChucK Audio Programming Language: A Strongly-timed and On-the-fly Environ/mentality*, PhD Thesis, Princeton University (2008). Of course, while specific instances of functional code defined in accordance with ChucK programming language specifications provides a useful descriptive context, software implementations and indeed programmed devices in accordance with the present invention need not employ ChucK programming tools or execution environments. More specifically, neither ChucK code examples, nor descriptions couched in ChucK-type language constructs or terminology is intended to limit the scope of the appended claims. In view of the foregoing, and without limitation, certain illustrative embodiments are now described.

Mobile Handheld Devices, Generally

Figure 5:
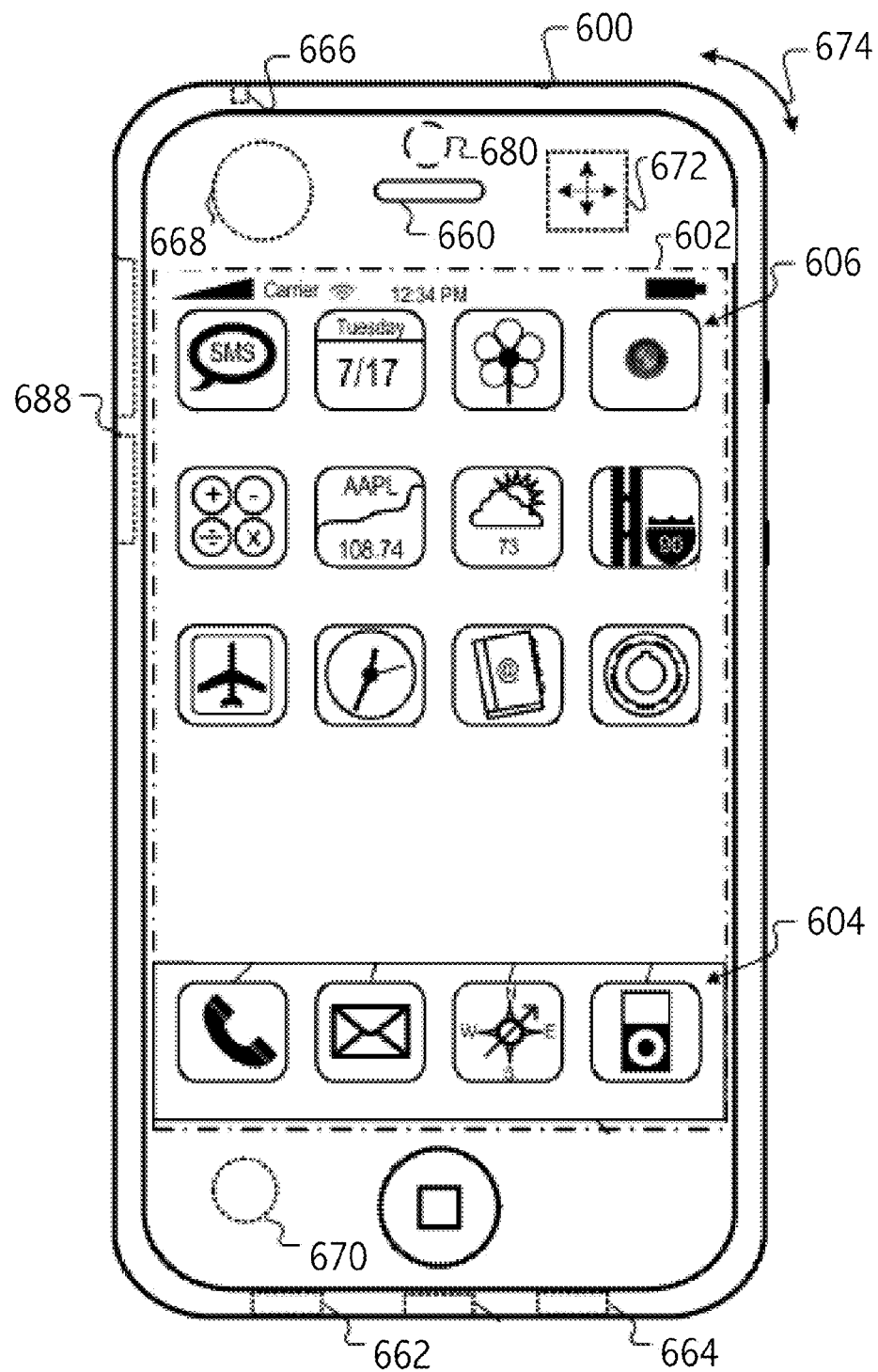
FIG. 5 illustrates features of a mobile device that may serve as a platform for execution of software implementations in accordance with some embodiments of the present invention.

FIG. 5 is a block diagram of a mobile device 600 that is generally consistent with commercially-available versions of an iPhone™ mobile device. Although embodiments of the present invention are certainly not limited to iPhone deployments or applications (or even to iPhone-type devices), the iPhone device, together with its rich complement of sensors, multimedia facilities, application programmer interfaces and wireless application delivery model, provides a highly capable platform on which to deploy certain implementations.

Summarizing briefly, mobile device 600 includes a display 602 that can be sensitive to haptic and/or tactile contact with a user. Touch-sensitive display 602 can support multi-touch features, processing multiple simultaneous touch points, including processing data related to the pressure, degree and/or position of each touch point. Such processing facilitates gestures and interactions with multiple fingers, chording, and other interactions. Of course, other touch-sensitive display technologies can also be used, e.g., a display in which contact is made using a stylus or other pointing device.

Typically, mobile device 600 presents a graphical user interface on the touch-sensitive display 602, providing the user access to various system objects and for conveying information. In some implementations, the graphical user interface can include one or more display objects 604, 606. In the example shown, the display objects 604, 606, are graphic representations of system objects. Examples of system objects include device functions, applications, windows, files, alerts, events, or other identifiable system objects. In some embodiments of the present invention, applications, when executed, provide at least some of the digital acoustic functionality described herein.

Typically, the mobile device 600 supports network connectivity including, for example, both mobile radio and wireless internetworking functionality to enable the user to travel with the mobile device 600 and its associated network-enabled functions. In some cases, the mobile device 600 can interact with other devices in the vicinity (e.g., via Wi-Fi, Bluetooth, etc.). For example, mobile device 600 can be configured to interact with peers or a base station for one or more devices. As such, mobile device 600 may grant or deny network access to other wireless devices. In some embodiments of the present invention, digital acoustic techniques may be employed to facilitate pairing of devices and/or other network-enabled functions.

Mobile device 600 includes a variety of input/output (I/O) devices, sensors and transducers. For example, a speaker 660 and a microphone 662 are typically included to facilitate voice-enabled functionalities, such as phone and voice mail functions. In some embodiments of the present invention, speaker 660 and microphone 662 may provide appropriate transducers for digital acoustic techniques described herein. An external speaker port 664 can be included to facilitate hands-free voice functionalities, such as speaker phone functions. An audio jack 666 can also be included for use of headphones and/or a microphone. In some embodiments, an external speaker or microphone may be used as a transducer for the digital acoustic techniques described herein.

Other sensors can also be used or provided. A proximity sensor 668 can be included to facilitate the detection of user positioning of mobile device 600. In some implementations, an ambient light sensor 670 can be utilized to facilitate adjusting brightness of the touch-sensitive display 602. An accelerometer 672 can be utilized to detect movement of mobile device 600, as indicated by the directional arrow 674. Accordingly, display objects and/or media can be presented according to a detected orientation, e.g., portrait or landscape. In some implementations, mobile device 600 may include circuitry and sensors for supporting a location determining capability, such as that provided by the global positioning system (GPS) or other positioning systems (e.g., systems using Wi-Fi access points, television signals, cellular grids, Uniform Resource Locators (URLs)). Mobile device 600 can also include a camera lens and sensor 680. In some implementations, the camera lens and sensor 680 can be located on the back surface of the mobile device 600. The camera can capture still images and/or video.

Mobile device 600 can also include one or more wireless communication subsystems, such as an 802.11b/g communication device, and/or a Bluetooth™ communication device 688. Other communication protocols can also be supported, including other 802.x communication protocols (e.g., WiMax, Wi-Fi, 3G), code division multiple access (CDMA), global system for mobile communications (GSM), Enhanced Data GSM Environment (EDGE), etc. A port device 690, e.g., a Universal Serial Bus (USB) port, or a docking port, or some other wired port connection, can be included and used to establish a wired connection to other computing devices, such as other communication devices 600, network access devices, a personal computer, a printer, or other processing devices capable of receiving and/or transmitting data. Port device 690 may also allow mobile device 600 to synchronize with a host device using one or more protocols, such as, for example, the TCP/IP, HTTP, UDP and any other known protocol.

New Possibilities for Digital Acoustic Communications

To augment, enhance or (in some cases) in place of the existing mix of communication channels and technologies implemented in modern handheld (or otherwise portable) devices, peer-to-peer acoustic communications may be provided via the speakers and microphones built into portable devices be they handhelds, laptop computers, netbooks, tablet PCs, etc. To facilitate an understanding of these techniques, we enumerate a brief list of interesting features which may appear in a class of embodiments, that are referred to herein as Acoustic MODEM Enabled moBile Applications (or AMOEBAs). Note that enumerated features are illustrative and need not appear in all embodiments, in any particular embodiment, or in precisely the manner described.

Limited hardware requirements: Often, a microphone, speaker and software executable on a processor will be sufficient for an AMOEBA implementation. In many embodiments, only the hardware typically found in mobile phones, voice recorders, and many other handheld devices will be required.

Peer to Peer: Many AMOEBA implementations are inherently peer to peer, with no network connectivity or services required. That said, some embodiments may operate in conjunction with other communications or services, including wireless network services.

Localized: Communications involving AMOEBAs are highly localized in that transmitters and receivers must be within "earshot" of each other.

Communications Discernable: Human users can hear when (and as) AMOEBAs are communicating, thus providing valuable feedback about device state and activity.

Multiple Audiences: AMOEBAs can talk to people too. Information can be encoded such that users can perceive and interpret it, or such that although users can hear the "carrier signal," they can not decode the actual encoded information.

Emotional Factors: AMOEBA communications can be charming and attractive to users, giving them a sense that they can witness the "conversation," and participate in it in some way. The "coolness" factor is a strong motivator and product differentiator in computer applications, especially in the growing mobile and entertainment device sectors. Allowing or causing your smart phone to strike up a "conversation" with another person's phone, a conversation that you and people around you can hear but possibly not understand, could become an attractive aspect of using AMOEBA-enabled devices.

Natural Sounds as "Carrier" for Encoded Information: As described herein, natural sounds such as cricket chirps, bird calls, ocean waves crashing, fire crackling, etc. can be used as an audible "carrier" signal. But data can be encoded within those natural sounds to carry information such as text messages, secret codes, system state (such as how many unheard voice mail messages a user has, or whether a particular stock has risen in price), etc.

Unregulated "Spectrum": The audio spectrum is free and unregulated. It works the same in all countries and in all languages.

Of course, there can also be potential limitations for devices that seek to employ acoustic techniques to transmit information. These include noise and crosstalk from other sources of sound (or other AMOEBAs), low data rates (when compared to wired/wireless alternatives), potential for irritating people with the sounds, etc. Nonetheless, for at least some applications, the feature sets enabled by targeted use of acoustic techniques may warrant the exploration and development of this new (but old) communications channel.

How Do AMOEBAs Talk to Each Other?

FIG. 1 is a functional block diagram that illustrates communication between mobile devices using acoustic techniques in accordance with some embodiments of the present invention. Mobile devices 101 and 102 each execute an acoustic modem enabled mobile application, which in the illustration of FIG. 1, includes simulation of a lighter and its flame together with audio consistent with flame characteristics and possibly the environment in which the simulated flame burns. Simulated dynamics may be responsive to numerous sensor inputs including orientation detected using an accelerometer or other sensor, intrusion into the simulated flame by a finger gesture sampled by a touch sensitive display, a wind field sensed based on acoustic energy sampled from a microphone, etc.

In any case, consistent with simulated flame dynamics, appropriate sounds (e.g., popping, crackling, even convection driven air flows) can be simulated and a corresponding acoustic signal is transduced at speaker 112. Sound waves 111 conveying the sounds propagate away from mobile device 101 toward the ears of persons (not specifically shown) including the user and potential bystanders. Sound waves 111 and the sounds conveyed thereby also propagate toward mobile device 102 and potentially toward other portable devices that execute acoustic modem enabled mobile applications. When received as such a device, e.g., at a microphone (which for simplicity of illustration is shown as microphone 113), the acoustic energy is transduced, sampled and processed using signal processing techniques to identify information that may (or may not) be encoded in the conveyed signal.

Although any of a wide variety of codings may be employed, a simple example provides some insight. In some embodiments, mere presence or absence of a frequency component may be used to convey information. For example, one or MARKER tones introduced amongst the popping, crackling, and gas flow sounds may be used to indicate "presence" of a nearby lighter to the acoustic modem enabled mobile application executing on mobile device 102, whereupon flame 121 may "pass" from mobile device 101 to mobile device 102. In some embodiments, additional sensors such as an accelerometer or proximity sensor may be used in combination with the tone detection to detect a physical gesture that is suggestive of the two devices being briefly proximate so as to "pass the light."

To a casual observer, the flame catches at mobile device 102 as if by magic. In fact, conveyance of the flame is by acoustic information transfer, and better still by acoustic information that is not discernable to the ear of human user separate and apart from the contextually appropriate sounds of popping, crackling, and air flow. No radio frequency communication or pairing is necessary.

In some embodiments, additional frequency components may encode additional information. For example, in an election season inspired variant, individuals may select a color coded party affiliation which may likewise be encoded in the contextually appropriate flame sounds (see sound waves 111) and acoustically conveyed to mobile device 102. In the illustrated example, TYPE1 and TYPE2 tones are used in a "one-or-the-other" coding to convey information about the "party affiliation" of flame 121. Depending on design choices or options selected, such "party affiliation" information conveyed by received lights, may affect the color (i.e., party affiliation of the flame 122) simulated at mobile device 102.

Any of a variety of particular tones may be employed to as markers and to characterize type. However, in general, it can be desirable to select a particular set of frequencies that are relatively prime, i.e., frequencies that have no common factor (other that 1). In this way, even if some harmonic distortion is introduced, the distortion will not imprint on some other relevant frequency. For example, were an implementation to pick 500 Hz and 600 Hz as information conveying frequencies, then distortion might cause 100 Hz and 1100 Hz (and maybe lots of others) intermodulation. Also, an appropriately broadband 100 Hz tone (like a sawtooth wave) might easily trigger 500 Hz and 600 Hz detectors. Persons of ordinary skill in the art will appreciate pertinent constraints. In some embodiments, a MARKER tone of 1801 Hz may be employed and TYPE1 and TYPE2 tones may be defined as 2399 Hz and 2593 Hz, respectively.

Although the scenario described with reference to FIG. 1 and the acoustic codings employed are quite simplistic, persons of ordinary skill in the art having benefit of the present disclosure will appreciate a wide range of extensions and applications to other situations and interactions. Indeed, the earliest days of pre-electronic communication used the beats of talking drums, smoke signals of some native plains tribes, vocal clicks and pops, and human vocal imitations of animals and other natural sounds. Analogous signaling techniques and their variants can be used in innovative ways for AMOEBA conversations as well. More generally, several coding methods are illustrative.

Method 1: AMOEBAs can communicate via pulses of sound, long or short, pre-defined rhythms, knocks, drum beats, etc. The main point here, as with all AMOEBA codes and methods, is that both the sender and receivers are machines (handheld mobile devices). Humans can listen in, and even possibly replace the sender or receiver in some cases, but the underlying purpose is to transmit information between computerized devices.

Method 2: AMOEBAs can use tones of different frequencies and/or lengths to encode information. A high tone can represent a binary one and a low tone can represent zero. A tone of a single frequency can be used, with a long pulse representing a binary one, and a short pulse to represent zero. The tones do not even have to be pure sinusoids or pitches, but can rather be the center resonance frequency of a filter, just so long as it can be detected and decoded by a machine "listener."

In each case, in addition to mere presence (or absence) of a particular acoustic pattern (e.g., as taps/knocks/pulses) or tonal characteristic, other aspects such as phase, amplitude or frequency may be modulated in ways that encode information for AMOEBA communications. Furthermore, many sounds in nature or familiar to humans are neither regularly structured (e.g., as taps/knocks/pulses), nor pitched high/low. Indeed this class of sounds can, in some cases, form a good working definition of noise: sounds which are neither pitched nor regular/predictable. Because of the capabilities of digital computers and signal processing, it is possible to create "noise" which sounds like noise to a human listener, but which has structure that a machine can detect to decode patterns within the noise. For example, Method 3: AMOEBAs can use structured noise to communicate information. Various patterns of clicks which appear irregular can be generated such that the technique by which the clicks are generated can be extracted, thus encoding information in seemingly random patterns.

Maximal Length Sequences (MLS), Gold Noise, and some error correcting codes have the property of being absolutely predictable noise, and thus could be used for AMOEBA communications. Clicks and pops can also exhibit frequency properties such that while not having pitch per-se, it can still be determined that they have higher or lower spectral energy. This can be used to encode high/low state as described in Method 2.

In the preceding examples, it will be understood that certain human discernable sounds are used, in effect, as a carrier signal for encodings of information that is generally not perceived (or perceivable) by a human. A brief, but non-exhaustive, list of example "carrier" signals for AMOEBA communication follows. In general, information may be modulated or otherwise encoded therein using one or more of the methods described herein.

Figure 2:
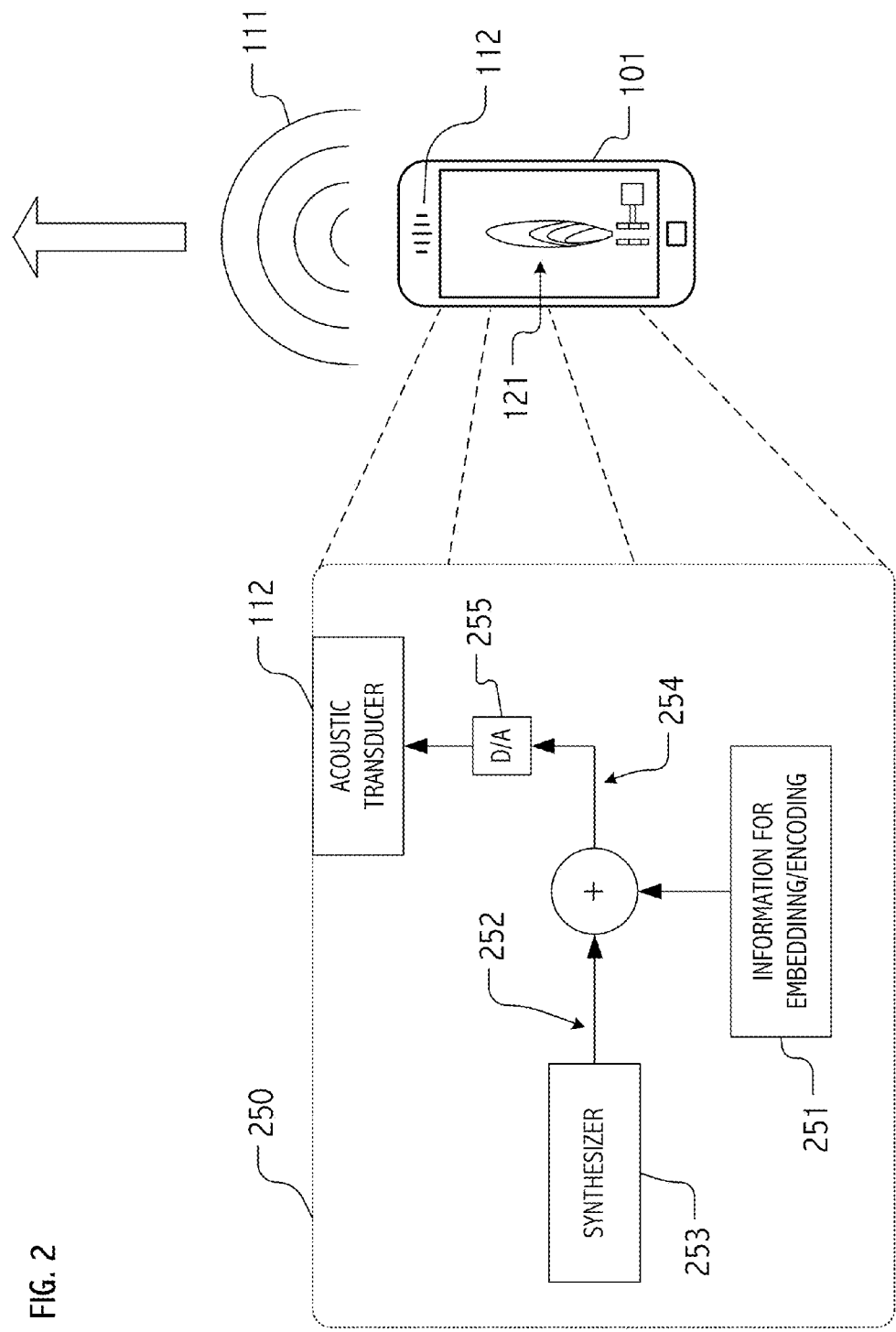
FIG. 2 is a functional block diagram and flow that illustrates transmit-side operation of a mobile device using digital acoustic techniques in accordance with some embodiments of the present invention.

Drums, Knocks, Sound Bursts, etc.
Animal Cries and Calls:
  Bird Calls
  Cricket Chirps
  Frog Chirps
  Purrs and other low frequency sounds
Other Pitched Sounds:
  Musical Instruments
  Human Voices (especially nonsense sounds)
Noise/Static
  Maximal Length Sequences, Error Codes, etc.
Clicks and Pops (less frequent than noise/static)
  Center Frequency
  Inter-click spacing
  Average Number of Clicks per time interval FIG. 2 is a functional block diagram and flow that illustrates transmit-side operation of a mobile device using digital acoustic techniques in accordance with some embodiments of the present invention. In particular, mobile device 101 executes an acoustic modem enabled mobile application that includes functionality (illustrated graphically as emitter code 250) that executes instructions on a processor in conjunction with a simulation of a flame.

Emitter code 250 introduces a desired information encoding 251 into signal 252 synthesized (using synthesizer 253). For example, in some embodiments, three tones (referred to herein as BASE, PEER and BLUE) are introduced to code a lighter executing at mobile device 101 and having a "blue" party affiliation. In general, the synthesized digital signal 259 into which the coded information is introduced may be for any human discernable sound. Typically, synthesized digital signal 259 is contextually relevant to the simulated behavior of flame 121. BASE, PEER and BLUE Tones are selected so as to be generally imperceptible to a human when included with the synthesized signal. In some cases, aspects of the synthesized signal may be selected to mask the information bearing tones.

In any case, the resultant signal 254 is converted to an analog signal using a D/A converter 255 and supplied to acoustic transducer (speaker) 112. As a result, sound waves 111 emanating outward from acoustic transducer 112 include both components discernable to a human ear (typically, the popping and crackling sounds) and components that encode information (such as a peer indication and party affiliation) in a way that is generally not perceivable by a human.

As previously explained, in some embodiments, a high-level audio programming language is used to code the acoustic processing. The exemplary ChucK source code that follows for a blue party affiliate variant of emitter code 250 sets up simple ramp oscillators at three frequencies (BASE, PEER and BLUE) and selectively introduces (or removes) the three frequency components (and related partials) from a signal supplied to the digital-to-analog converter (dac).

```
// name: emitter-blue.ck
// desc: emits blue
// generate sine
Phasor drive => Gen10 g10 => ADSR g => dac;
Phasor drive2 => Gen10 h10 => g;
Phasor drive3 => Gen10 i10 => g;
// noise
Noise n => ResonZ f => g;
// set only first coefficient
g10.coefs([1.0]);
h10.coefs([1.0]);
i10.coefs([1.0]);
// base frequency
BASE => drive.freq;
// peer frequency
PEER => drive2.freq;
// blue frequency
BLUE => drive3.freq;
// set gain
0.025 => g10.gain;
0.025 => h10.gain;
0.025 => i10.gain;
if(SMIgn.getInt("G") == 2) {
    0.015 => i10.gain;
}
// set noise
.1 => n.gain;
1801 => f.freq;
8 => f.Q;
// overall gain
1 => g.gain;
// set ADSR
g.set( 3000::ms, 50::ms, .95, 50::ms );
// wait for chuck to get ready
Lighter.chuckReady( );
// instantiate
Lighter lighter;
// connect
fun void connect( ) {
    if( !g10.isConnectedTo( g ) )   {
        g10 => g;
        h10 => g;
        i10 => g;
        f => g;
        g.keyOn( );
    }
}
// disconnect
fun void disconnect( ) {
    if ( g10.isConnectedTo( g ) ) {
        g.keyOff( );
        g.releaseTime( ) => now;
        g10 =< g;
        h10 =< g;
        i10 =< g;
        f =< g;
    }
}
while( true ) {
    if( lighter.flameOn( ) && lighter.valvePressed( ) ) {
        connect( );
        1 => g10.op => h10.op => i10.op;
    }
```

```
    else {
        disconnect( );
        0 => g10.op => h10.op => i10.op;
    }
    50::ms => now;
}
```

In the illustrated code, although a Gen10 unit generator one codes generation of related sets of harmonic partials, coefficients produce just the primary frequency components. Control over the selective introduction (and removal) of the frequency components is based on a user interface event lighter. valvePressed ( ). Noise is modeled and included in the signals supplied.

Figure 3:
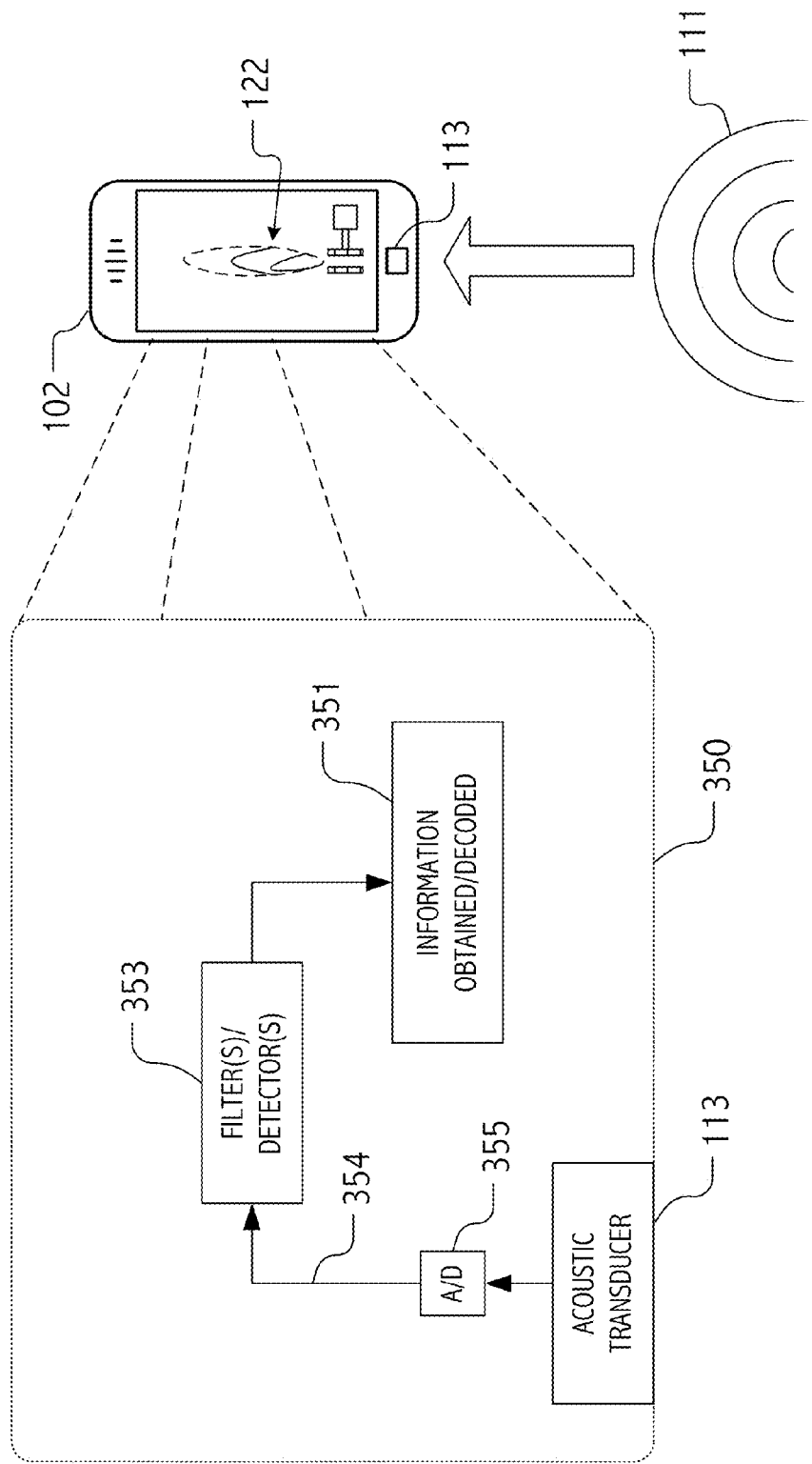
FIG. 3 is a functional block diagram and flow that illustrates receive-side operation of a mobile device using digital acoustic techniques in accordance with some embodiments of the present invention.

Turning now to FIG. 3, a second functional block diagram and flow illustrates receive-side operation of a mobile device using digital acoustic techniques in accordance with some embodiments of the present invention. In particular, mobile device 102 executes an acoustic modem enabled mobile application that includes functionality (illustrated graphically as receiver code 350) that executes instructions on a processor to receive a light. Receiver code 350 uses resonant filters to detect the particular frequency components introduced into by emitter code 250 (recall FIG. 2) and to discriminate between transduced signals that include, in addition to the aforementioned BASE and PEER frequency components at, either a frequency (RED) coding "red" party affiliation or that (BLUE) previously described for "blue" emitter code used to code "blue" party affiliation.

In some embodiments, frequencies are selected as follows:
BASE=1423 Hz;
PEER=1801 Hz;
RED=2399 Hz; and
BLUE=2593 Hz.

Acoustic transducer (microphone) 113 converts incoming acoustic energy (including that conveyed by sound waves 111 from mobile device 101) into analog signals which are in turn converted at analog-to-digital converter 355 to a received digital signal 354. Received digital signal is, in turn, processed by filters or detectors to identify frequency components of interest (if present), namely those at frequencies denoted BASE and PEER that identify a lighter, and those at frequencies RED and BLUE that, if present, code party affiliation. In general, any of a variety of filter/detection techniques may be employed including peak matching using fast Fourier transforms (FFT) and application of matched, two-pole, resonant filters.

As before, in some embodiments, a high-level audio programming language is used to code the acoustic processing. Exemplary ChucK source code corresponding to receiver code 350 sets up matched resonant filters at four frequencies (BASE, PEER, RED and BLUE) and a detects corresponding frequency component in the received digital signal supplied by the analog-to-digital converter (adc). More specifically, resonant filter setup will be understood based on the ChucK source code that follows:

```
// name: FindMultiSineRB.ck
// desc: multi sine detector based on BiQuad with
   envelope/power ratio
// resonant filter to detect steady sine at one frequency
adc => ResonZ reson => OnePole follower => blackhole;
reson => follower; // this smooths the squared output
3 => follower.op; // this squares output to detect envelope
// one more resonator for one more sine frequency
adc => ResonZ reson3 => OnePole follower3 => blackhole;
reson3 => follower3;
3 => follower3.op;
// one more resonator for one more sine frequency
adc => ResonZ reson4 => OnePole follower4 => blackhole;
reson4 => follower4;
3 => follower4.op;
// one more resonator for one more sine frequency
adc => ResonZ reson5 => OnePole follower5 => blackhole;
reson5 => follower5;
3 => follower5.op;
// power detector for incoming signal
adc => OnePole power => blackhole;
adc => power;
3 => power.op;
// reson freq (base, peer, red, blue)
BASE => reson.freq; // base sine present in all lighters
PEER => reson3.freq; // any other lighter
RED => reson4.freq; // add this for red, either/or
BLUE => reson5.freq; // add this for blue, either/or
// reson Q very high to detect only coherent sine waves
100 => reson.Q => reson3.Q => reson4.Q => reson5.Q;
// reson gain
150 => reson.gain => reson3.gain => reson4.gain =>
   reson5.gain;
// envelope follower pole to smooth squared filter output
.95 => follower.pole => follower3.pole => follower4.pole =>
   follower5.pole;
.95 => power.pole;
```

Then, based on whether the lighter is in a shouldDetect state, current samples are either dropped or filtered to detect corresponding frequencies. Simple predicates test power ratios to identify, based on received signal 354, the characteristic frequencies of another lighter, and if coded, a party affiliation.

```
// synchronize
Lighter.chuckReady( );
// instantiate
Lighter lighter;
// counter
0 => int count;
0 => int red;
0 => int blue;
float val;
float pow;
// connect
fun void connect( ) {
    if( !follower.isConnectedTo( blackhole ) )    {
        // delay (1.1, ge)
        800::ms => now;
        follower => blackhole; // suck samples
        follower3 => blackhole;
        follower4 => blackhole;
        follower5 => blackhole;
    }
}
// disconnect( )
fun void disconnect( ) {
    if( follower.isConnectedTo( blackhole ) )    {
        follower =< blackhole; // stops sample sucking
        follower3 =< blackhole;
        follower4 =< blackhole;
        follower5 =< blackhole;
    }
}
100 => float threshold;
80 => float rb__threshold;
// go
while( true ) {
    // get pow
    power.last( ) => pow;
```

-continued

```
    if( pow < .000002 ) .000002 => pow;
    // check all frequencies to see if/what lighter is there
    if( lighter.shouldDetect( ) ) {
       // connect
       connect( );
       // detect base
       if( follower.last( ) > .002 &&
          follower.last( ) / pow > threshold ) {
          // detect red
          if( follower4.last( ) > .002 &&
             follower4.last( ) / pow > rb_threshold ) {
             red++; 0 => blue;
          }
          // detect blue
          else if( follower5.last( ) > .002 &&
             follower5.last( ) / pow > rb_threshold )
          {
             blue++; 0 => red;
          }
          else {
             0 => red => blue;
          }
          else if( follower3.last( ) > .002 &&
             follower3.last( ) / pow > threshold )
             // count
             count++; 0 => mule;
             if( count++ > 7 ) {
                if(red > 3) {
                   1 => Lighter2.redOrBlue;
                }
                else if(blue > 3) {
                   2 => Lighter2.redOrBlue;
                }
                else {
                   0 => Lighter2.redOrBlue;
                }
                // send signal
                Lighter.DETECTED_PEER =>
                   lighter.lighterDetected;
             }
          }
          else {
             // reset everything
             0 => count;
          }
       }
    }
    else {
       // disconnect
       disconnect( );
       Lighter.DETECTED_NONE => lighter.lighterDetected;
       0 => count;
       0 => red => blue;
    }
    // set power
    pow => lighter.micPower;
    // every 50 ms
    100::ms => now;
}
```

Building on the foregoing, a contagious fire application has been developed in which an AMOEBA user executes a simulation of fire on their mobile device, including graphics of flame, smoke, and sparks. The device makes the appropriate sounds of fire including rumbling, flame and rushing gasses, snaps and sparks that are appropriate to the dynamic image presented on screen. The presence of one or more other mobile devices running the AMOEBA-enabled Contagious Fire application allows them to exchange information. Specifically, one mobile phone can "light" another by bringing the two close together. Information is encoded in the snapping and sparking, either through center-frequency resonances, or through length, density, and/or proximity of pulses about the state of the fire (color and brightness, for instance). Thus, one phone with white-hot flame can intensify others nearby. Each user within a "friend network" can have a unique pattern embedded in their fire sounds, allowing AMOEBAs to identify each other by sound. This could be useful in many social networking applications. As an example, friends could determine that they like the same song by the same musical group just from the properties of their "virtual lighters" or, as described above, party affiliation can be coded in election season theme variation.

Other Acoustic Modem Enabled Application Examples

Two additional examples follow and demonstrate the potential of AMOEBAs. These should not be seen as being limiting, or even representative of the full range of possibilities for this technology.

Cricket Dating

An AMOEBA user is in a coffee shop and hears a distinctive cricket chirp. Enabling her Cricket Dating AMOEBA mobile application confirms her suspicions that the cricket chirps she hears carry information about a man across the shop holding an AMOEBA-enabled cell phone. Her phone displays his information and a link to his online profile. After checking him out a little, she instructs her Cricket Dating AMOEBA to transmit an invitation to chat locally via Bluetooth, and includes her four-digit passcode so that he can connect his phone directly to hers. No more cricket chirps or AMOEBA communications are needed, but AMOEBA software can be used to transmit other information if desired, or to invite others to the mobile chat room.

Figure 4:
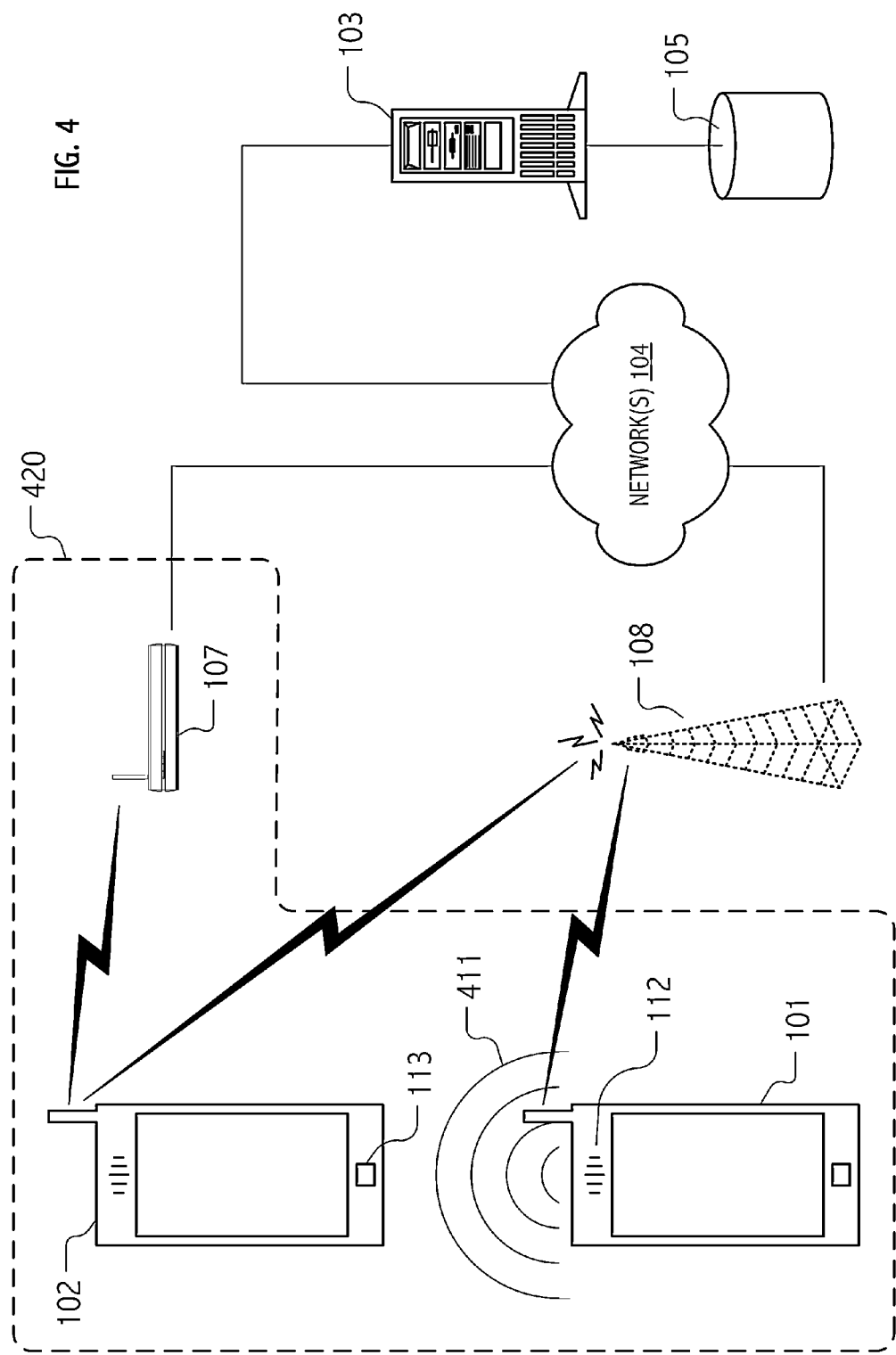
FIG. 4 is a functional block diagram that illustrates, in a multi-technology communications system architecture, acoustic conveyance of information between mobile devices in accordance with some embodiments of the present invention.

Consistent with the foregoing, FIG. 4 is a functional block diagram that illustrates, in a multi-technology communications system architecture, acoustic conveyance 411 of information (such as may be encoded in the aforementioned cricket chirps and conveyed across coffee shop 420) from mobile device 101 to mobile device 102.

Group Music Meditation

A group of AMOEBA-enabled mobile device users find themselves in close proximity to each other, and decide to engage in a little collaborative meditation and music making. They each fire up their Prayer Bowl AMOEBA program, and begin "striking" and "bowing" the chime sounds using various gestures such as tapping and rubbing the touch-sensitive mobile phone screen. They can also detune the resonances of the bowl slightly by tilting their mobile devices. Each user has a (subtly) unique set of frequencies in their bell sound, because as each new AMOEBA program begins running it "listens" to the others already running and picks unique frequencies to complement the existing ones.

Alternatively, each user could already be assigned a truly unique combination of frequencies at the time they purchase and register their copy of the Prayer Bowl AMOEBA program or based on some unique identifier such as a MAC address for a network interface of the hosting device. As more users join, the sound grows more complex but always stays consonant and harmonious, in keeping with common meditation practice. Users can strike, bow, and "bend" their sounds, and the players and bell sounds can optionally sync to a common subtle rhythmic pulse, by listening to each other, both human and machine.

Illustrative Implementations and Coding Techniques

In some embodiments, information is conveyed from one handheld AMOEBA-equipped mobile device to another by embedding data in acoustic energy transmitted and received by the devices using respective speakers and microphones thereof as acoustic transducers. For example, in some embodiments, sine waves are embedded in otherwise discernable (or even recognizable) sounds in such a way that the embedded sine waves cannot be easily perceived by humans, and yet an AMOEBA can determine if those sines are present (or not), as well as the frequencies, phases and/or amplitudes.

In general, frequencies are easiest to detect. Phases can be a bit harder and amplitudes are typically the most difficult due to the nature of acoustics.

In general, depending on the nature of information encoding employed, the detection technique(s) can include tuned resonant filters (simplest being a two-pole recursive digital bandpass filter), peak-picking in the magnitude spectrum (e.g., computed using a fast Fourier transform), or by computation of one or more quadrature heterodyne filters (multiply the signal by a sine and cosine at the frequency of interest, essentially the computation of one targeted bin of the FFT frequency spectrum). The FFT or quadrature heterodyne output magnitudes can be averaged over time, to compute a power spectral density (PSD). PSD techniques generally result in noise suppression and allow stable sinusoidal components to emerge. In these and other ways, an AMEOBA may detect (or otherwise extract) information encoded in the acoustic energy that is generally not perceivable to humans.

Thus, in some embodiments, it is possible to embed one or more sine wave (or perhaps a time-varying set of sine waves) into an audio signal in a way that is not perceivable by a human but can nonetheless be detected by DSP algorithms implemented by the receiving AMEOBA-equipped device. In some cases, Fletcher Munson equal loudness contours for human hearing, masking threshold curves for human hearing, and/or testing with actual human subjects may be useful to determine and optimize efficacy of the information encodings. In general, an audio synthesizer may be employed to supply a signal that includes both audio that is discernable by a human (and even pleasing thereto) and the embedded (though generally not perceivable) sine waves used to encode the conveyed information. In some applications, sines are embedded in a signal that is synthesized to simulate fire sounds, applause or wind chimes. In any case, the signal (once transduced at a speaker of a first device, conveyed to the second, and transduced at a microphone thereof) may be sampled and detected using digital signal processing techniques.

For example, the receiving AMEOBA-equipped device may detect the embedded sine waves (and/or characteristics thereof) using techniques such as resonant bandpass filtering (BPF), fast Fourier transform (FFT) peak picking, quadrature heterodyne filtering (QHF) and/or power spectral density (PSD) computed by averaging FFT or QHF outputs. Depending on the implementation, a BPF or QHF technique may be computationally preferred, particularly if we know the frequencies we are looking for (or pattern they are following) and simply want to see if the expected frequency/pattern appears in the received signal.

Tibetan Prayer Bowl Example

Although embedded information may be encoded using sounds that are (in-effect) subliminal, non-subliminal tones or sines may also be employed in ways that are still not perceived by a human. For example, for many sounds that already have constituent sinusoids, it is still possible to control or perturb those sinusoidal components in such a way that the sound, while still natural, encodes detectable patterns therein. One illustrative example is an AMOEBA implementation that synthesizes multiple non-harmonic overtones that characterize an acoustically modeled Tibetan prayer bowl. The synthesized sound includes multiple constituent sine waves, but using modern signal processing techniques our ability to detect a set of constituent overtones (or perturbations thereto) is accurate enough, that it is possible to guarantee a unique prayer bowl to each of 200 Trillion potential users (using MAC address, for example). For example, consider the MAC address:

aa:bb:cc:dd:ee:ff where each doublet between colons can have a value from 0 to 255. Six non-harmonic sinusoidal partials of a synthesized prayer bowl could be allocated as follows:

| |
|---|
| $f1 = 251 + aa$ Hz. |
| $f2 = 512 + 2*bb$ Hz. |
| $f3 = 1081 + 3*cc$ Hz. |
| $f4 = 1851 + 3*dd$ Hz. |
| $f5 = 2613 + 3*ee$ Hz. |
| $f6 = 3391 + 3*ff$ Hz. |

Of course, other coding schemes abound and this one is just an example.

In any case, building on these or other suitable techniques, AMEOBA users/devices can identify each other, as well as trade and propagate bowls (i.e., a simulation thereof based on conveyed acoustic model parameters). As before, BPF, FFT and/or QHF techniques may be used to detect the constituents, although an FFT may be preferable in that all relevant frequencies may be detected simultaneously. In general, it is possible to determine whether acoustic energy that sounds like a prayer bowl is an AMEOBA synthesis or a real physical prayer bowl. In some embodiments, other identifiers (such as device serial number) may be used to assign frequencies. In some embodiments, users may select from available sets of frequencies.

Cricket Dating Example

Referring illustratively to the previously introduced Cricket Dating AMOEBA application previously described, cricket chirps can generally be synthesized as modulated sine waves, wherein modulation is mostly in amplitude, but some in frequency. Building on such a synthesis, we can further modulate the signal(s) to encode information. For example, on simple but effective coding scheme uses high/low tones to code values for bits. In general, this technique differs from old fashioned acoustic modemetry in that we craft our modulated tones so they sound like bio signals, e.g., crickets, cicadas, other noisy bugs, birds, other animal sounds, etc. Accordingly, in a transmitting Cricket Dating AMOEBA application, we can craft sine waves modulated in amplitude and frequency such that they still sound like bug/animal sounds yet encode the information used in the interaction, while at the receiving Cricket Dating AMOEBA application use BPF/QHF/FFT techniques to detect the encoded information.

Slightly Bent Harmonic Sounds

Musical instruments, the voice, and other highly-pitched sounds have harmonic spectra wherein the sinusoidal components are arranged as integer multiples of a fundamental frequency (100 Hz, 200 Hz, 300 Hz, etc.) Through synthesis, it is possible to mimic these sounds but perturb one or more harmonics in frequency, amplitude, and phase. The sound is relatively unaffected, but DSP algorithms can be used to detect the perturbations. Data can be transmitted in this way. For example: 100, 200, 290, 400 Hz could represent a logical "0" and 100, 200, 310, 400 Hz could represent a logical "1." This difference would be audibly small or indistinguishable by the human auditory system, but easily detected by DSP techniques implemented at an AMEOBA.

Contagious Fire Example

For AMEOBAs that present interactive fire sounds, one technique is to synthesize lots of pops and crackles with a large variety of resonant center frequencies, but to allocate specific frequency regions for the events we wish to encode and detect. By detecting the presence of pops and crackles, one fire can light another (fire present). By detecting the average number of events per time period at particular frequencies, information about state of the fire can be determined. As an example, the frequencies 2000, 2300, and 2600 Hz. could be used to encode up to 9 states of fire heat, flame color, or other information.

Other Sounds

Many sounds, such as wind, applause, ocean waves, etc. do not contain sine waves, but are inherently noisy. It is possible to embed information in these types of sounds by structuring the noise, or by synthesizing the noisy sounds directly while controlling their parameters such as to embed data within the final sound. As with previous examples, the goal is to do this without human listeners being able to detect it, but to enable DSP algorithms to detect the signals and retrieve the data.

One method is to synthesize certain discrete events such as hand claps within applause, or pops/snaps within a fire sound, such that these events are detectable by DSP. Wavelets or matched filters with specific attributes designed to pick up the discrete events can be used to detect the presence of the events.

Another technique will be understood in the context of a large number of synthesized clapping entities. Most of the entities may be in phase in a stereo signal, but a particular clapper that is mixed out of phase with the others in the stereo field. This clapper will not be detectable among the ensemble in stereo, but by forming a mono signal by simply mixing the two stereo channels, only the single clapper will be present. The clapping could be in the pattern of standard Morse code, easily detectable by machine (or even a trained radio/telegraph operator). However, even a skilled radio/telegraph operator would not detect or decode the information in the multi-clapper stereo signal.

While the invention(s) is (are) described with reference to various embodiments, it will be understood that these embodiments are illustrative and that the scope of the invention(s) is not limited to them. Many variations, modifications, additions, and improvements are possible. For example, while particular techniques for encoding information in certain familiar sounds have been described in detail herein, other encoding techniques and synthesis of other suitable sounds will be appreciated based on the description herein. Furthermore, while certain illustrative signal processing techniques have been described in the context of certain illustrative applications, persons of ordinary skill in the art will recognize that it is straightforward to modify the described techniques to accommodate other suitable signal processing techniques.

In general, plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the invention(s).

What is claimed is:

1. A peer-to-peer method of acoustically and bi-directionally communicating information between a first portable device and a second, the method comprising:
    encoding first information in a signal that, when converted into first acoustic energy at an acoustic transducer of the first portable device, is characterized in that the first acoustic energy is discernable to a human ear yet the encoding of the first information therein is not perceivable by the human apart from the first acoustic energy itself;
    transmitting the first acoustic energy from the acoustic transducer of the first portable device toward the second portable device across an air gap that constitutes a substantially entirety of the distance therebetween; and
    receiving at the acoustic transducer of the first portable device second acoustic energy, the second acoustic energy being from the second portable device, wherein the second acoustic energy is also characterized in that the second acoustic energy is itself discernable to a human ear yet an encoding of second information therein is not perceivable by the human.

2. A method of acoustically communicating information from a first portable device toward a second, the method comprising:
    encoding the information in a signal that, when converted into acoustic energy at an acoustic transducer of the first portable device, is characterized in that the acoustic energy is discernable to a human ear yet the encoding of the information therein is not perceivable by the human apart from the acoustic energy itself; and
    transmitting the acoustic energy from the acoustic transducer of the first portable device toward the second portable device across an air gap that constitutes a substantially entirety of the distance therebetween,
    wherein the information encoded in the acoustic transmission conveys one of character and state for a physical object simulated at the first portable device.

3. The method of claim 2,
    wherein the simulated physical process includes a flame for which a dynamic visual presentation is displayed on the first portable device;
    wherein the acoustic energy discernable to the human ear includes one or more of pops and crackles consonant with the displayed flame; and
    wherein the information not perceivable by the human but coded in the acoustic energy includes one or more of size, orientation, simulated heat and color of the displayed flame.

4. The method of claim 3,
    wherein the information not perceivable by the human but coded in the acoustic energy further characterizes a wind field in which the simulated flame burns.

5. The method of claim 2,
    wherein the simulated physical object is a musical instrument characterized, at least in part, by plural non-harmonic overtones produced thereby.

6. The method of claim 5,
    wherein the physical object simulated is one of a Tibetan prayer bowl, clock/church tower bells and a bell-type object.

7. The method of claim 5, further comprising:
    propagating an instance of the characterized musical instrument to the second portable device for simulation thereon,
    the characterizing non-harmonic overtones not individually perceivable by the human.

8. The method of claim 5, further comprising:
    multi-dimensionally coding the information as one or more of frequency, phase and amplitude modulations of at least some of the characterizing non-harmonic overtones.

9. The method of claim 8, wherein the multi-dimensional coding conveys one or more of:
- a 6-tuple that corresponds to a media access control (MAC) address of the first portable device; and
- a serial number or other identifier.

10. The method of claim 1,
wherein the first information encoded in the acoustic transmission conveys an identifier associated or associable with a user of the first portable device.

11. The method of claim 10, wherein the user identifier encodes one or more of:
- a signature;
- a vcard; and
- a resource identifier, the resource identifier usable by the second portable device to retrieve information associated with the user.

12. The method of claim 1,
wherein the first information encoded in the acoustic transmission conveys an identifier associated or associable with the first portable device.

13. The method of claim 12,
wherein the first portable device includes a radio frequency (RF) communication interface; and
wherein the identifier conveyed by the acoustic transmission facilitates RF communication with the first portable device.

14. The method of claim 13,
wherein the identifier conveyed constitutes a beacon that identifies the first portable device and is broadcast to the second portable device and to at least one other device acoustically proximate to the first portable device.

15. The method of claim 13,
wherein the identifier conveyed by the first information encoded in the acoustic transmission solicits or facilitates a pairing interchange over the radio frequency (RF) communication interface in accord with a wireless personal area network protocol.

16. The method of claim 1, further comprising:
at the first portable device, synthesizing the first acoustic energy to present to the human ear a sound having a generally recognizable physical analog.

17. The method of claim 16,
wherein the first acoustic energy includes the encoded first information at least partially as a sinusoid not employed in the synthesis of sound corresponding to the generally recognizable physical analog, but detectable at the second portable device.

18. The method of claim 16,
wherein the first acoustic energy includes the encoded first information at least partially as one or more of frequency, phase and amplitude modulation of a sinusoid employed in the synthesis of sound corresponding to the generally recognizable physical analog.

19. The method of claim 16,
wherein the first acoustic energy includes the encoded first information at least partially as a selection plural non-harmonic overtones thereof.

20. The method of claim 16,
wherein the first acoustic energy includes the encoded first information at least partially as frequency, phase and amplitude modulation of plural non-harmonic overtones thereof.

21. The method of claim 16,
wherein the first acoustic energy includes harmonics of one or more fundamental frequencies associated with the generally recognizable physical analog; and
wherein the encoded first information is represented at least partially as a frequency, phase and amplitude perturbation of at least one of the harmonics.

22. The method of claim 16,
wherein the first acoustic energy includes noise; and
wherein the encoded first information is represented at least partially as a structure imparted to the noise.

23. The method of claim 16,
wherein the first acoustic energy includes a plurality of constituents presented in phase in a stereo field together with an additional constituent that is out of phase with the plurality of constituents;
wherein the encoded first information is represented at least partially using the out-of-phase constituent.

24. A computer program product encoded in one or more media, the computer program product including instructions executable on a processor of the first portable device to cause the first portable device to perform the method of claim 1.

25. The computer program product of claim 24, wherein the one or more media are readable by the first portable device or readable incident to a computer program product conveying transmission to the first portable device.

26. The method of claim 1, further comprising:
sampling a signal transduced from the second acoustic energy; and
processing the sampled signal at the first portable device to extract the second information encoded therein.

27. A method of receiving acoustically communicated information from a first portable device, the method comprising:
receiving acoustic energy at an acoustic transducer of a second portable device, the received acoustic energy transmitted from the first portable device across an air gap that constitutes a substantially entirety of the distance between the first and second portable devices, wherein the received acoustic energy is characterized in that the acoustic energy is itself discernable to a human ear yet an encoding of information therein is not perceivable by the human;
sampling a signal transduced from the received acoustic energy; and
processing the sampled signal at the second portable device to extract the information encoded therein,
wherein the information encoded in the received acoustic energy conveys one of character and state for a physical object simulated at the first portable device.

28. A computer program product encoded in one or more media, the computer program product including instructions executable on a processor of the second portable device to cause the second portable device to perform the method of claim 27.

29. The computer program product of claim 27, wherein the one or more media are readable by the first portable device or readable incident to a computer program product conveying transmission to the second portable device.

30. A portable device comprising:
one or more acoustic transducers capable of converting a first signal into outgoing acoustic energy and capable of converting into a second signal incoming acoustic energy received from across an air gap that constitutes a substantially entirety of the distance between the portable device and a second portable device;
a transmit path that encodes in the first signal, first information destined for one or more remote receivers, wherein the first signal is characterized in that outgoing acoustic energy converted therefrom is discernable to a human ear yet the encoding of the first information therein is not perceivable by the human apart from the acoustic energy itself; and a receive path that extracts second information from the second signal transduced from the incoming acoustic energy, wherein the incoming acoustic energy is discernable to the human ear yet the second information encoded therein is not perceivable by the human apart from the acoustic energy itself.

31. The portable device of claim 30, embodied as one or more of a handheld mobile device, a mobile phone, a laptop or notebook computer, a personal digital assistant, a smart phone, a media player, a netbook, and a book reader.

32. The method of claim 27, wherein the processing includes one or more of:
applying one or more resonant tuned resonant filters to the sampled signal;
peak picking in a range of spectral magnitudes computed for the sampled signal using a fast Fourier transform (FFT);
applying a quadrature heterodyne filter (QHF) to the sampled signal; and
computing a power spectral density (PSD) for the sampled signal.

33. The method of claim 1,
wherein the second acoustic energy presents to the human ear a sound having a generally recognizable physical analog.

34. A method of receiving acoustically communicated information from a first portable device, the method comprising:
receiving acoustic energy at an acoustic transducer of a second portable device, the received acoustic energy transmitted from the first portable device across an air gap that constitutes a substantially entirety of the distance between the first and second portable devices, wherein the received acoustic energy is characterized in that the acoustic energy is itself discernable to a human ear yet an encoding of information therein is not perceivable by the human;
sampling a signal transduced from the received acoustic energy; and
processing the sampled signal at the second portable device to extract the information encoded therein,
wherein the received acoustic energy presents to the human ear a sound having a generally recognizable physical analog, and
wherein the received acoustic energy includes the encoded information at least partially as a sinusoid not employed in a synthesis of the sound corresponding to the generally recognizable physical analog, but nonetheless detectable at the second portable device.

35. The method of claim 33,
wherein the received acoustic energy includes the encoded information at least partially as one or more of frequency, phase and amplitude modulation of a sinusoid employed in a synthesis of sound corresponding to the generally recognizable physical analog.

36. The method of claim 33,
wherein the received acoustic energy includes the encoded information at least partially as a selection plural non-harmonic overtones thereof.

37. The method of claim 33,
wherein the received acoustic energy includes the encoded information at least partially as frequency, phase and amplitude modulation of plural non-harmonic overtones thereof.

38. The method of claim 33,
wherein the received acoustic energy includes harmonics of one or more fundamental frequencies associated with the generally recognizable physical analog; and
wherein the encoded information is represented at least partially as a frequency, phase and amplitude perturbation of at least one of the harmonics.

39. The method of claim 33,
wherein the received acoustic energy includes a plurality of constituents presented in phase in a stereo field together with an additional constituent that is out of phase with the plurality of constituents;
wherein the encoded information is represented at least partially using the out-of-phase constituent.

40. A portable device comprising:
one or more acoustic transducers capable of converting a first signal into outgoing acoustic energy and capable of converting into a second signal incoming acoustic energy received from across an air gap that constitutes a substantially entirety of the distance between the portable device and a second portable device;
a transmit path that encodes in the first signal, first information destined for one or more remote receivers, wherein the first signal is characterized in that outgoing acoustic energy converted therefrom is discernable to a human ear yet the encoding of the first information therein is not perceivable by the human apart from the acoustic energy itself; and
a receive path that extracts second information from the second signal transduced from the incoming acoustic energy, wherein the incoming acoustic energy is discernable to the human ear yet the second information encoded therein is not perceivable by the human apart from the acoustic energy itself,
wherein the information encoded in either or both of the outgoing and incoming acoustic energy conveys one of character and state for a physical object simulated at the first portable device.

41. The portable device of claim 30,
wherein either or both of the outgoing and incoming acoustic energy presents to the human ear a sound having a generally recognizable physical analog.

42. A method of acoustically communicating information from a first portable device toward a second, the method comprising:
encoding the information in a signal that, when converted into acoustic energy at an acoustic transducer of the first portable device, is characterized in that the acoustic energy is discernable to a human ear yet the encoding of the information therein is not perceivable by the human apart from the acoustic energy itself;
transmitting the acoustic energy from the acoustic transducer of the first portable device toward the second portable device across an air gap that constitutes a substantially entirety of the distance therebetween; and
at the first portable device, synthesizing the acoustic energy to present to the human ear a sound having a generally recognizable physical analog,
wherein the acoustic energy includes at least one or more selected from the group consisting of:
(i) the encoded information at least partially as a sinusoid not employed in the synthesis of sound corresponding to the generally recognizable physical analog, but detectable at the second portable device,
(ii) the encoded information at least partially as one or more of frequency, phase and amplitude modulation of a sinusoid employed in the synthesis of sound corresponding to the generally recognizable physical analog, (iii) the encoded information at least partially as a selection plural non-harmonic overtones thereof, (iv) the encoded information at least partially as frequency, phase and amplitude modulation of plural non-harmonic overtones thereof, (v) harmonics of one or more fundamental frequencies associated with the generally recognizable physical analog, wherein the encoded information is represented at least partially as a frequency, phase and amplitude perturbation of at least one of the harmonics, (vi) noise, wherein the encoded information is represented at least partially as a structure imparted to the noise, and (vii) a plurality of constituents presented in phase in a stereo field together with an additional constituent that is out of phase with the plurality of constituents, wherein the encoded information is represented at least partially using the out-of-phase constituent.

43. A method of receiving acoustically communicated information from a first portable device, the method comprising:

receiving acoustic energy at an acoustic transducer of a second portable device, the received acoustic energy transmitted from the first portable device across an air gap that constitutes a substantially entirety of the distance between the first and second portable devices, wherein the received acoustic energy is characterized in that the acoustic energy is itself discernable to a human ear yet an encoding of information therein is not perceivable by the human;

sampling a signal transduced from the received acoustic energy; and processing the sampled signal at the second portable device to extract the information encoded therein, wherein the received acoustic energy presents to the human ear a sound having a generally recognizable physical analog, wherein the received acoustic energy includes at least one or more selected from the group consisting of:

(i) the encoded information at least partially as one or more of frequency, phase and amplitude modulation of a sinusoid employed in a synthesis of sound corresponding to the generally recognizable physical analog, (ii) the encoded information at least partially as a selection plural non-harmonic overtones thereof, (iii) the encoded information at least partially as frequency, phase and amplitude modulation of plural non-harmonic overtones thereof, (iv) harmonics of one or more fundamental frequencies associated with the generally recognizable physical analog, wherein the encoded information is represented at least partially as a frequency, phase and amplitude perturbation of at least one of the harmonics, and (v) a plurality of constituents presented in phase in a stereo field together with an additional constituent that is out of phase with the plurality of constituents, wherein the encoded information is represented at least partially using the out-of-phase constituent.

* * * * *